US012562962B2

(12) United States Patent
Fordos et al.

(10) Patent No.: US 12,562,962 B2
(45) Date of Patent: Feb. 24, 2026

(54) PARALLEL EXECUTION OF NETWORK SERVICES WITH OVERLAPPING DEVICE CONFIGURATION

(71) Applicant: Cisco Technology, Inc., San Jose, CA (US)

(72) Inventors: Viktoria Fordos, Bandhagen (SE); Claes Daniel Nasten, Burea (SE)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 18/488,365

(22) Filed: Oct. 17, 2023

(65) Prior Publication Data

US 2024/0048448 A1 Feb. 8, 2024

Related U.S. Application Data

(63) Continuation of application No. 18/121,965, filed on Mar. 15, 2023, now Pat. No. 11,848,820, which is a (Continued)

(51) Int. Cl.
H04L 41/0893 (2022.01)
H04L 41/0213 (2022.01)
(Continued)

(52) U.S. Cl.
CPC ...... H04L 41/0893 (2013.01); H04L 41/0213 (2013.01); H04L 41/0233 (2013.01); H04L 41/0654 (2013.01); H04L 67/12 (2013.01)

(58) Field of Classification Search
CPC ............. G06F 16/2365; H04L 67/1095; H04L 41/0873; H04L 41/0866
See application file for complete search history.

(56) References Cited

U.S. PATENT DOCUMENTS 10,374,886 B1 * 8/2019 A ........................... H04L 41/082
10,554,486 B2 * 2/2020 Kaufman ............ G06F 9/44505
(Continued)

FOREIGN PATENT DOCUMENTS

CN 109669772 A 4/2019
EP 3989486 A1 4/2022
WO WO-2021213644 A1 * 10/2021 ......... H04L 41/0873

OTHER PUBLICATIONS

Office Action for U.S. Appl. No. 18/121,965, mailed on Jul. 5, 2023, Viktoria Fordos, "Parallel Execution of Network Services With Overlapping Device Configuration", 6 pages.
(Continued)

*Primary Examiner* — Madhu Woolcock
(74) *Attorney, Agent, or Firm* — Lee & Hayes, P.C.

(57) ABSTRACT

Techniques, methods, and systems for managing a set of data network nodes in a Network Management System (NMS). In some examples, a method may include receiving, at the network orchestrator, a service invocation for a service transaction associated with a transaction object; storing, by the network orchestrator, service metadata as part of the transaction object; determining whether there is a service metadata conflict associated with the transaction object; and in response to determining that there is the service metadata conflict associated with the transaction object, retrying the service transaction; or in response to determining that there is no service metadata conflict associated with the transaction object, applying the service metadata to one or more nodes of the set of data nodes.

20 Claims, 7 Drawing Sheets

Related U.S. Application Data continuation of application No. 17/752,663, filed on May 24, 2022, now Pat. No. 11,632,301.

(51) Int. Cl.

| | |
|---|---|
| *H04L 41/0233* | (2022.01) |
| *H04L 41/0654* | (2022.01) |
| *H04L 67/12* | (2022.01) |

(56) References Cited

U.S. PATENT DOCUMENTS

| | | | | |
|---|---|---|---|---|
| 10,567,223 | B1* | 2/2020 | Sidaraddi | H04L 41/0859 |
| 11,409,625 | B2* | 8/2022 | Abraham | G06F 21/51 |
| 11,451,440 | B1* | 9/2022 | Deshmukh | H04L 41/0873 |
| 11,632,301 | B1 | 4/2023 | Fordos et al. | |
| 11,848,820 | B1 | 12/2023 | Fordos et al. | |
| 2004/0215639 | A1 | 10/2004 | Bamford et al. | |
| 2008/0242247 | A1* | 10/2008 | Shaffer | H04L 12/1827 |
| | | | | 455/187.1 |
| 2009/0133026 | A1* | 5/2009 | Aggarwal | G06F 9/4843 |
| | | | | 718/103 |
| 2012/0151495 | A1 | 6/2012 | Burckhardt et al. | |
| 2015/0378774 | A1 | 12/2015 | Vermeulen | |
| 2016/0020949 | A1* | 1/2016 | Mares | H04L 41/0813 |
| | | | | 709/221 |
| 2016/0070589 | A1 | 3/2016 | Vermeulen | |
| 2016/0149760 | A1* | 5/2016 | Voit | H04L 41/0813 |
| | | | | 709/221 |
| 2017/0177610 | A1* | 6/2017 | Knotts | G06F 40/166 |
| 2017/0228411 | A1 | 8/2017 | Cadarette et al. | |
| 2017/0228415 | A1 | 8/2017 | Cadarette | |
| 2018/0329945 | A1 | 11/2018 | Horii et al. | |
| 2018/0351806 | A1 | 12/2018 | Mohanram et al. | |
| 2019/0286627 | A1 | 9/2019 | Cadarette et al. | |
| 2020/0233699 | A1* | 7/2020 | Occhialini | G06F 9/4881 |
| 2022/0179642 | A1* | 6/2022 | Liang | G06F 8/65 |
| 2023/0305886 | A1* | 9/2023 | Devulapalli | G06F 9/4881 |

OTHER PUBLICATIONS

The PCT Search Report and Written Opinion mailed Sep. 12, 2023 for PCT application No. PCT/US23/23323, 13 pages.

* cited by examiner

Figure 3:
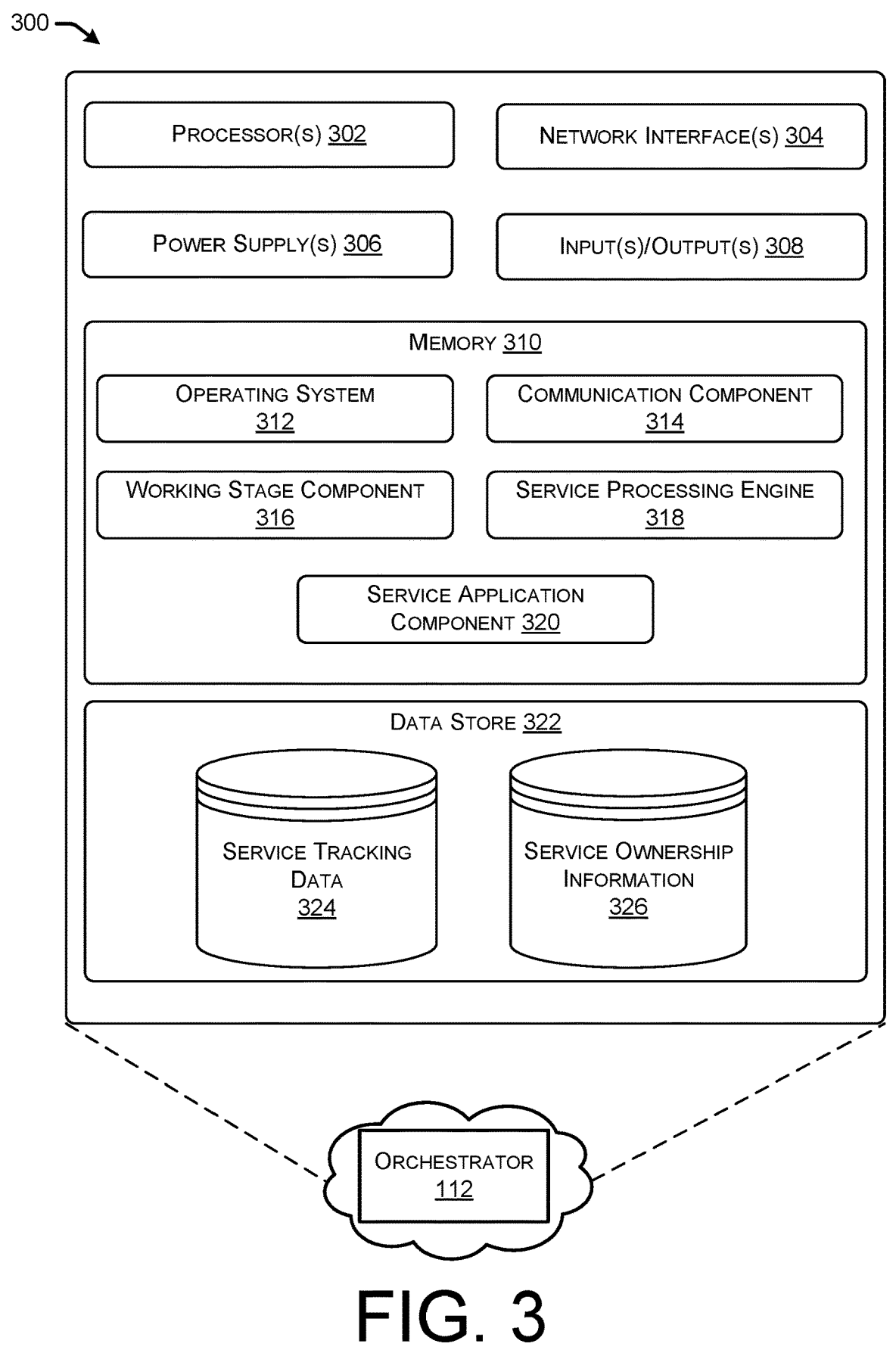

300

PROCESSOR(S) 302

NETWORK INTERFACE(S) 304

POWER SUPPLY(S) 306

INPUT(S)/OUTPUT(S) 308

MEMORY 310

OPERATING SYSTEM
312

COMMUNICATION COMPONENT
314

WORKING STAGE COMPONENT
316

SERVICE PROCESSING ENGINE
318

SERVICE APPLICATION
COMPONENT 320

DATA STORE 322

SERVICE TRACKING
DATA
324

SERVICE OWNERSHIP
INFORMATION
326

ORCHESTRATOR
112

Figure 4:
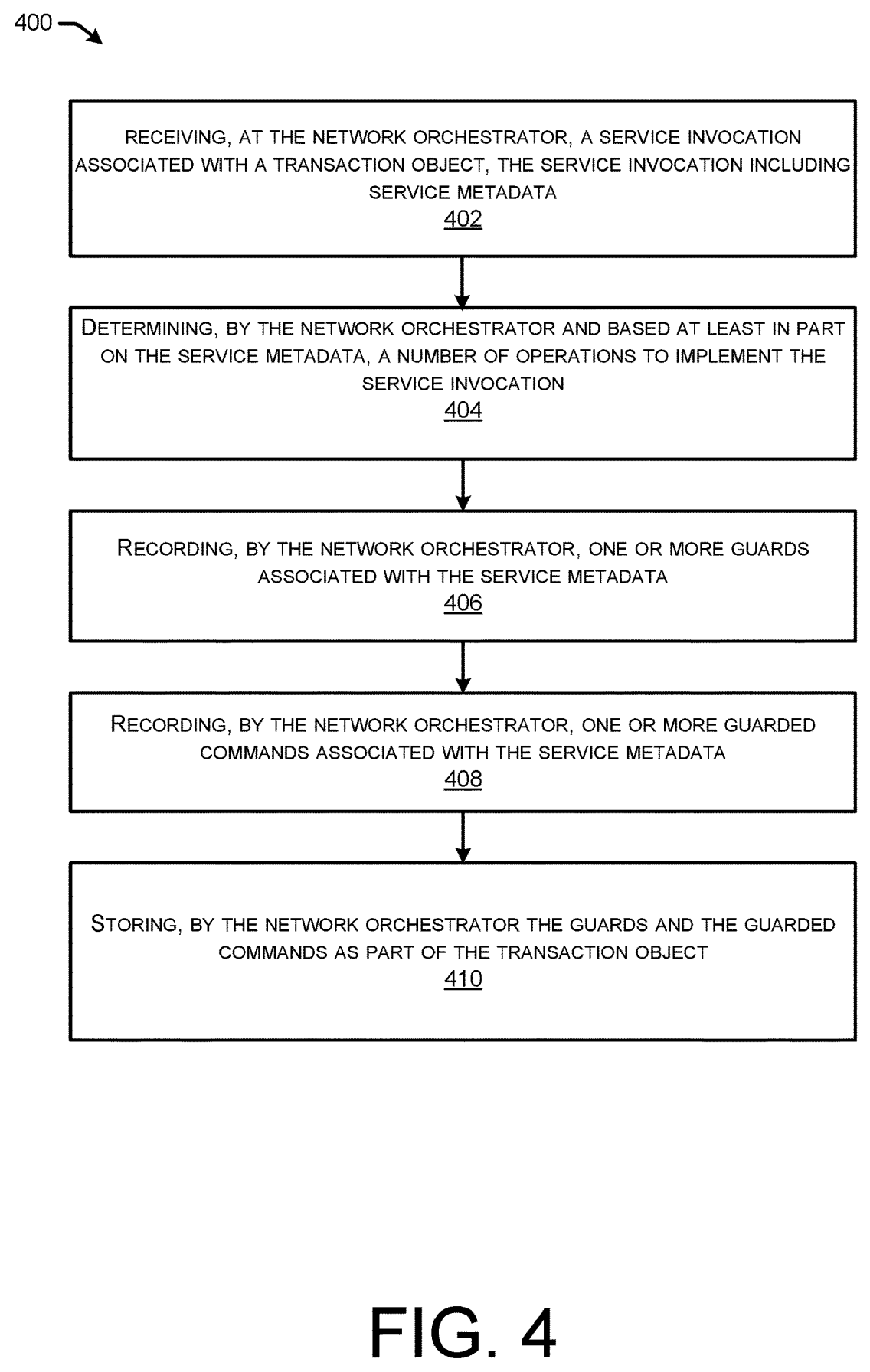

RECEIVING, AT THE NETWORK ORCHESTRATOR, A SERVICE INVOCATION
ASSOCIATED WITH A TRANSACTION OBJECT, THE SERVICE INVOCATION INCLUDING
SERVICE METADATA
402

DETERMINING, BY THE NETWORK ORCHESTRATOR AND BASED AT LEAST IN PART
ON THE SERVICE METADATA, A NUMBER OF OPERATIONS TO IMPLEMENT THE
SERVICE INVOCATION
404

RECORDING, BY THE NETWORK ORCHESTRATOR, ONE OR MORE GUARDS
ASSOCIATED WITH THE SERVICE METADATA
406

RECORDING, BY THE NETWORK ORCHESTRATOR, ONE OR MORE GUARDED
COMMANDS ASSOCIATED WITH THE SERVICE METADATA
408

STORING, BY THE NETWORK ORCHESTRATOR THE GUARDS AND THE GUARDED
COMMANDS AS PART OF THE TRANSACTION OBJECT
410

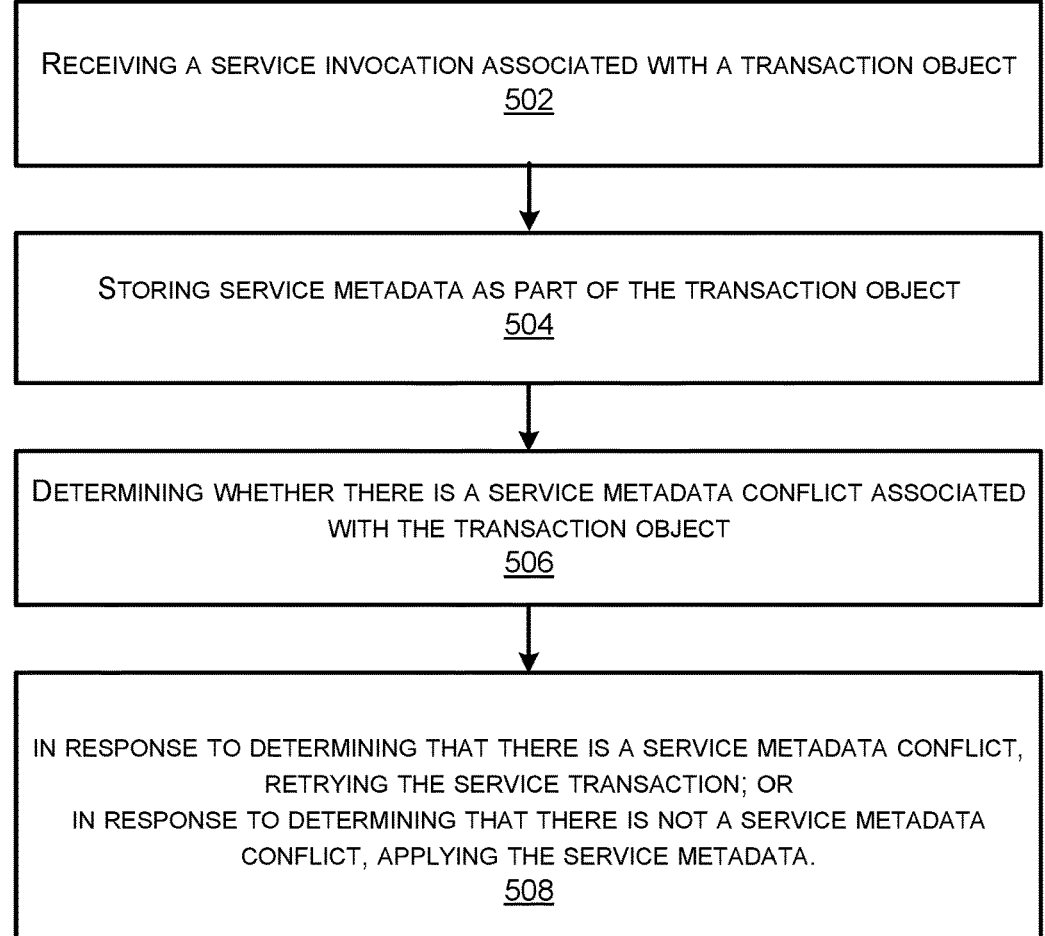

RECEIVING A SERVICE INVOCATION ASSOCIATED WITH A TRANSACTION OBJECT
502

STORING SERVICE METADATA AS PART OF THE TRANSACTION OBJECT
504

DETERMINING WHETHER THERE IS A SERVICE METADATA CONFLICT ASSOCIATED WITH THE TRANSACTION OBJECT
506

IN RESPONSE TO DETERMINING THAT THERE IS A SERVICE METADATA CONFLICT, RETRYING THE SERVICE TRANSACTION; OR
IN RESPONSE TO DETERMINING THAT THERE IS NOT A SERVICE METADATA CONFLICT, APPLYING THE SERVICE METADATA.
508

FIG. 5

PARALLEL EXECUTION OF NETWORK SERVICES WITH OVERLAPPING DEVICE CONFIGURATION

RELATED APPLICATIONS

This application claims priority to and is a continuation of U.S. patent application Ser. No. 18/121,965, filed on Mar. 15, 2023, which claims priority to and is a continuation of U.S. patent application Ser. No. 17/752,663, filed on May 24, 2022, the entire contents of which are incorporated herein by reference.

TECHNICAL FIELD

The present disclosure relates generally to using a Network Management System (NMS) to enable parallel execution of network services in the nodes of the data network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller or orchestrator such that the control plane is abstracted from the data forwarding functions in the discrete networking devices. The SDN orchestrator is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), Python, and so forth. These SDN protocols allow the SDN orchestrator to directly interact with the forwarding plane of network devices (such as switches and routers) using, for example, various application programming interfaces (APIs).

Traditionally, SDN would use these SDN protocols in order to program network devices or push down changes to the switch/router flow-table, thereby allowing the SDN controller to partition traffic, control flows for optimal performance, test new configurations and applications, and/or otherwise control or steer data plane traffic. To perform various services, network nodes or devices need to be configured to execute several different type of network functions (e.g., packet drop functions, packet duplicate functions, packet forward functions, etc.). However, it can be inefficient, insecure, or otherwise disadvantageous to configure services for individual managed devices or nodes of a data network. For instance, creation of service instances for individual devices or nodes in the data network, typically affects several other managed devices or nodes. Thus, creation of a service in the data network typically may include a series of reconfigurations of several different devices or nodes in the data network. Additionally, as needs of the network change, it may be necessary to re-configure the individual network devices or nodes, which can be inefficient, and time consuming.

In light of various inefficiencies and disadvantages of managing and configuring individual devices and nodes in a data network, a Network Management System (NMS) may be used in a data network, allowing networks to be more flexible and cost-effective. An NMS is typically an application or set of application that lets the network users manage the network devices inside the data network, and perform several key functions. An NMS identifies, configures, monitors, updates and troubleshoots network devices in the data network, allowing the network users to configure the devices, analyzes and monitors the performance, or makes changes as needed. In addition, NMS enables network vendors to provide their performance data to the NMS through Application programming Interface (API) or a protocol (e.g., Netflow). Thus, NMS provides a powerful, flexible and extensible toolbox for network orchestration and automations which enables network users and vendors to control or add features to a wide variety of network devices efficiently. For instance, in a data network which includes NMS, the network client may only need to provide a source code indicating the NMS node how to deploy a service, and the NMS will process and execute the service automatically.

In practice, multiple services can overlap, such that multiple services may attempt to make a configuration change to the same configuration node. This implies that the multiple service instances have shared ownership. Shared ownership of configuration nodes can cause conflicts, resulting in service restarts or service aborts, which adds significant time to overall processing time of the transaction request, and may limit the throughput of the network orchestrator. For instance, conflicts may occur every time concurrent services run in parallel and/or where there is an update in service ownership information of a node. Therefore, there is a need for mechanisms and methods to provide parallel execution of network services where there are overlapping device configurations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates a network orchestrator and its processing flow for processing multiple transaction requests.

FIG. 3 illustrates a component diagram of an example network orchestrator that can be utilized to implement aspects of technologies disclosed herein.

FIG. 4 illustrates a flow diagram of an example method for processing transactions by a network orchestrator while in a service invocation phase.

FIG. 5 illustrates a flow diagram of an example method processing multiple service transactions in an orchestrator of a data network.

DESCRIPTION OF EXAMPLE EMBODIMENTS

Overview

Figure 1:
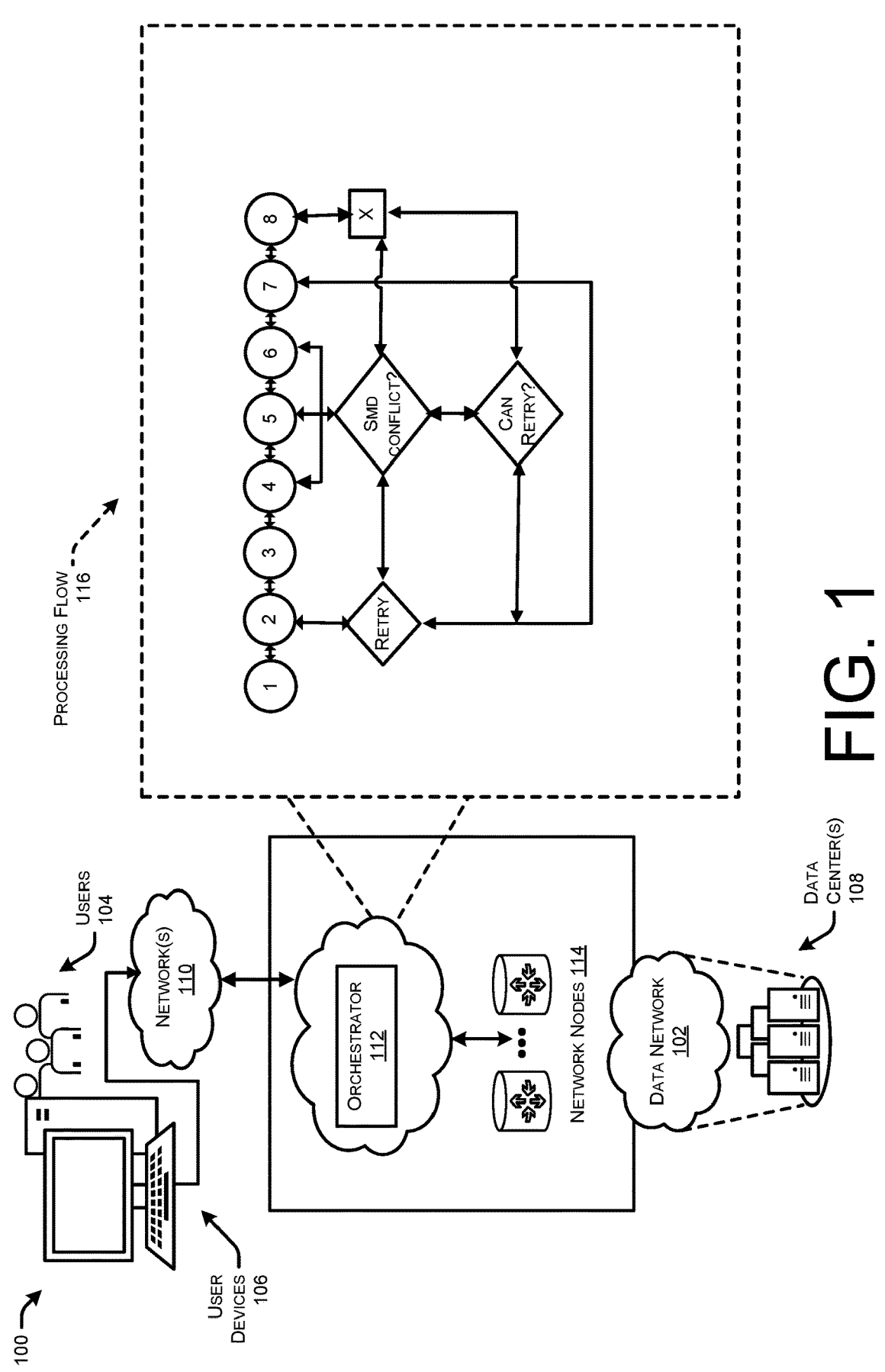
FIG. 1 illustrates a system architecture for a Network Management System (NMS) for configuring a set of network devices in a data network.

The present disclosure describes a method for a network orchestrator to manage a set of data network nodes in a network management system (NMS) in a data network, the method may performed using control-plane techniques by the orchestration component (e.g., software defined network (SDN) controller). The method may include receiving, at the network orchestrator, a service invocation for a service transaction associated with a transaction object; storing, by the network orchestrator, service metadata as part of the transaction object; determining whether there is a service metadata conflict associated with the transaction object; and in response to determining that there is the service metadata conflict associated with the transaction object, retrying the service transaction; or in response to determining that there is no service metadata conflict associated with the transaction object, applying the service metadata to one or more nodes of the set of data nodes.

Additionally, the techniques described herein may be performed by a system and/or device having non-transitory computer-readable media storing computer-executable instructions that, when executed by one or more processors, performs the method described.

Example Embodiments

Computer networking has continued to evolve and become more complex in terms of how network devices are controlled or instructed to communicate data through network architectures. For instance, SDN technologies emerged, continue to evolve, and generally include using an orchestrator such that the network services are separated from the network devices, however automatically configuring the network services from the network devices as per the service specifications provided.

Network orchestrators or controllers are built to orchestrate this execution. They have intimate knowledge of the network's configuration, architecture, infrastructure elements, users and their devices, and traffic patterns. Orchestrators that follow the intent-based networking model allow input of business objectives that they translate into network actions that they orchestrate.

As noted above, a network orchestrator uses its automation and orchestration capabilities to perform these functions. In other words, network orchestration is a subset of network management functions. Thus, an orchestrator can use a Network Management (NMS) System to implement network administrating and operating functions. Thus, it can provide a method for re-configuring a set of nodes in the data network. Using an NMS can help network users or administrators to configure, monitors, updates and troubleshoots the network devices in the data network. In the present NMS system, the service application programmer has to implement software code for each service created. The modification, update, and deletion of a service is subsequently enabled to be handled automatically. This reduces the programing complexity, and workload for the network administrators, and thus ease the burden on the network administrators. However, various inefficiencies and disadvantages still exist when using an NMS for creating and handling services received in the network orchestrator. For example, the network orchestrator can execute a single service, and if multiple services are received at the orchestrator which may have conflicts in their processing time, it cannot detect and process them.

In practice, multiple services can overlap, such that multiple services may attempt to make a configuration change to the same node. This implies that the multiple service instances have shared ownership. Shared ownership of configuration nodes can cause conflicts, resulting in service restarts, which adds significant time to overall processing time of the transaction request, and may limit the throughput of the network orchestrator. For instance, conflicts may occur every time concurrent services run in parallel and/or where there is an update in service ownership information of a node. Therefore, there is a need for mechanisms and methods to provide parallel execution of network services where there are overlapping device configurations.

This disclosure describes techniques and mechanisms for enabling parallel execution of network services with overlapping device configurations in a data network. The techniques may include receiving, at a network orchestrator, a service invocation for a service transaction associated with a transaction object; storing, by the network orchestrator, service metadata as part of the transaction object; determining whether there is a service metadata conflict associated with the transaction object; and in response to determining that there is the service metadata conflict associated with the transaction object, retrying the service transaction; or in response to determining that there is no service metadata conflict associated with the transaction object, applying the service metadata to one or more nodes of the set of data nodes.

The techniques described herein are based on optimistic concurrency control protocol for XML datastore, and refine the network service orchestrator. Optimistic concurrency control protocols offer great transactional throughput under the assumption that transactional conflicts happen only occasionally. The optimistic transactions may have three phases: (i) work phase, (ii) validation phase, (iii) update phase. These transactions work in their own workspace, and employ no locking during the work phase. At the validation phase, they enter the critical section where they check that any value they read during the working phase is still valid. If the check succeeds, the transaction proceeds to the update phase, where the underlying datastore is updated and the critical section is left. If the check fails, the transaction aborts and the critical section is left. Updated optimistic concurrency protocol for XML datastore may also be required consider the hierarchy of XML datastore.

As described herein, a network orchestrator may support processing of multiple service invocations. In this regard, the network orchestrator may contain the following objects to process parallel transactions with overlapping configuration (i) Northbound Application Programing Interface (API), (ii) N active transaction objects, (iii) service processing engine, (iv) Datastore, (v) Southbound API to deliver changes to the data network, and/or any other component described herein.

As used herein a "service" is an abstraction that transforms a user intent into (device) configuration changes.

Accordingly, the techniques described herein may be used to reduce the number of conflicts occur due to conflicting services invocations by automatically resolving the conflicts, and thus maximizes the concurrent network service invocations. As a result, the provided techniques can increase the achievable throughput of the NMS in a data network. Moreover, the techniques described herein enables services with overlapping configuration nodes to execute in parallel and reducing the number of service restarts due to conflicts and/or service conflicts.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture for a Network Management System (NMS) for enabling parallel execution of network services with overlapping device configuration in a data network. The environment 100 includes a data network 102, and in which users 104 of user devices 106 utilize a domain-specific language to express and compile network functions to perform network operations. FIG. 1 further illustrates a network controller or orchestrator 112 in the data network 102 deploying the network function at an optimal location (e.g., on an optimal network component or device) in the data network 102.

In some examples, the data network 102 may include devices housed or located in one or more data centers 108. The data network 102 may include one or more networks implemented by any viable communication technology, such as wired and/or wireless modalities and/or technologies. The data network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The data network 102 may include devices, virtual resources, or other nodes that relay packets from one network segment to another by nodes in the computer network. The data network 102 may include multiple devices that utilize the network layer (and/or session layer, transport layer, etc.) in the OSI model for packet forwarding, and/or other layers. The data network 102 may include various hardware devices, such as routers, switches, gateways, smart NICs, NICs, ASICs, FPGAs, servers, and/or any other type of device. Further, the data network 102 may include virtual resources, such as VMs, containers, and/or other virtual resources.

The one or more data centers 108 may be physical facilities or buildings located across geographic areas that designated to store networked devices that are part of the data network 102. The data centers 108 may include various networking devices, as well as redundant or backup components and infrastructure for power supply, data communications connections, environmental controls, and various security devices. In some examples, the data centers 108 may include one or more virtual data centers which are a pool or collection of cloud infrastructure resources specifically designed for enterprise needs, and/or for cloud-based service provider needs. Generally, the data centers 108 (physical and/or virtual) may provide basic resources such as processor (CPU), memory (RAM), storage (disk), and networking (bandwidth). However, in some examples the devices in the packet-forwarding networks 102 may not be located in explicitly defined data centers 108, but may be located in other locations or buildings.

The user devices 106 may establish communication connections over one or more networks 110 to communicate with devices (e.g., such as network nodes 114, or other device(s)) in the data network 102, such as a network orchestrator or controller 112 of the data network 102. The network(s) 110 may include any viable communication technology, such as wired and/or wireless modalities and/or technologies. Networks 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 106 may communicate using any type of protocol over the network 110, such as the transmission control protocol/Internet protocol (TCP/IP) that is used to govern connects to and over the Internet.

The orchestrator 112 enables processing of multiple network services invocations. In some implementation, the orchestrator 112 may include the following objects: (i) Northbound Application Programing Interface (API), (ii) N active transaction objects, (iii) service processing unit, (iv) Datastore, (v) Southbound API to deliver changes to the data network, and/or any other suitable component.

As illustrated, the orchestrator 112, may execute a processing flow 116 to process the multiple services requests arrived at the orchestrator. The processing flow 116 allows the orchestrator 112 to execute multiple services with overlapping device configuration in parallel.

At "1", the network orchestrator 112 may receive a service request. The service request may arrive through the northbound API of the network orchestrator and triggers an optimistic transaction object. The request may read and write configuration data through the transaction object, and then it may commit the transaction object. As noted above, the transaction object may comprise an optimistic transaction object, which may include a service intent. For instance, the service request may correspond to a service intent, such as a request to set up a VPN for an end user (e.g., create request).

At "2", the network orchestrator 112 may create a checkpoint of indicating of its state. The checkpoint is used to declare a point that the transaction is in a consistent state. At a checkpoint, the transaction information may be stored in a datastore. In some examples, the checkpoint may include the service intent and may be used by the network orchestrator to restart the service where a previous attempt at running the service has failed.

At "3", after the checkpoint has been created, the transaction object enters the service invocation phase. During the service invocation phase, the network orchestrator and/or service processing engine applies the service intent of the transaction object. For instance, the network orchestrator and/or service processing engine may calculate the minimal set of operations (e.g., create, modify, delete, etc.) on the configuration node level to deliver the result of the service intent to the network. When calculating the minimal set of operations, the service processing engine makes decisions based both on the current state of the node and on the shared ownership information (e.g., service metadata) assigned to the node. Each decision made by the service processing engine needs to be guarded, therefore, all assumptions the service processing engine makes are recorded as guards (e.g., guarded commands with no-op as the operation). Based on the decisions, the service processing engine may record service metadata changes (e.g., service ownership changes) on the node as guarded commands. The recorded guards and guarded commands may be stored by the transaction object. At the end of the service invocation phase, the transaction object may comprise one or more of the service intent, one or more configuration change(s) determined by the service processing engine, and/or service metadata context comprising one or more guarded commands.

Accordingly, by recording the service metadata at the service invocation phase and not applying the service metadata until the critical section (e.g., 7, or later), the service metadata is not part of the change-set of the optimistic transaction object. This means that the service metadata will not cause transaction conflicts, thereby reducing the overall number of transaction conflicts at the network orchestrator and reducing the number of times service transactions are restarted, which may improve throughput at the network orchestrator and/or nodes of the network. For instance, by recording the service metadata at the service invocation phase, the network orchestrator will only detect a service metadata conflict where two concurrent services create and/or delete the same configuration node in parallel. In this example, the network orchestrator may resolve the conflict by rerunning one of the services. Moreover, by using guarded commands, all other service metadata conflicts (e.g., conflicts other than two services creating/deleting metadata on the same node in parallel) resulting from parallel service invocations changing the metadata on the same node are automatically resolved, resulting in fewer service conflicts.

At "4", the network orchestrator 112 performs an initial conflict check on the transaction object. The initial conflict check may not be performed on shared ownership information of the transaction object. For instance, an initial read-write conflict detection may be performed on the transaction object before entering the critical section. First, the transaction may perform the read-write operation outside of the lock. If the initial conflict detection finds conflict, the execution continues by checking if the conflict is a service metadata conflict. The network orchestrator may determine whether the conflict is a service metadata conflict by evaluating each of the recorded guarded commands for the node.

If, while executing the guarded commands, one of the guarded commands fails, the conflict is determined to be a service metadata conflict and the transaction is retried. If all of the guarded commands pass, then the network orchestrator checks if the transaction can be retried or needs to be aborted. The transaction can be retried where all of the conflicts occurred during a retry scheme (e.g., during service invocation, during callbacks, and/or any other appropriate retry scheme).

At "5", if there is no conflict, the transaction object may take the lock. At this point, the transaction object may enter the validation phase and the critical section. By taking the lock, the transaction object ensures that only one transaction may be in the validation phase at any given time. The transaction object may leave the critical section (e.g., the critical section may end) when one of the following occurs: (i) the changes of the transaction are propagated to the network, (ii) the transaction aborts, or (iii) when a conflict is identified and there is a retry scheme that is applicable to the transaction, such that the transaction is retried.

At "6", the transaction object may perform an incremental conflict detection inside the lock. If incremental conflict detection determines that the transaction does not conflict with any other transaction objects that have committed since the transaction object has performed its initial conflict detection, the transaction may be validated. If the incremental conflict detection finds conflict, the execution continues by checking if the conflict is a service metadata conflict. The network orchestrator may determine whether the conflict is a service metadata conflict by evaluating each of the recorded guarded commands for the node. If, while executing the guarded commands, one of the guarded commands fails, the conflict is determined to be a service metadata conflict and the transaction is retried. If all of the guarded commands pass, then the network orchestrator checks if the transaction can be retried or needs to be aborted. The transaction can be retried where all of the conflicts occurred during a retry scheme (e.g., during service invocation, during callbacks, and/or any other appropriate retry scheme). Since this process is considered expensive as only one transaction object can be in the critical section at a given time, reducing the amount of conflicts and/or time in the critical section may improve throughput of the network orchestrator and/or data node(s).

At "7", if there is no conflict then the network orchestrator may apply the service metadata. For instance, for each node where there is a shared ownership change and a sequence of guarded commands recorded as part of the transaction object. The network orchestrator may read the current value (s) of each guarded command from a database associated with the node and, using the current value(s), apply each guarded command in sequence. If any of the guarded commands fail, then the network orchestrator determines that an unresolvable service metadata conflict has occurred and the service transaction is retried. In some examples, the service transaction may be retried automatically by the network operator (e.g., without user and/or administrator input). If all of the guarded commands pass, then new service metadata may be calculated, where the new service metadata comprises a result of applying each guarded command (e.g., performing the guarded command only if the guard passes) in a sequence for a given node. The new service metadata may represent the updated shared ownership information. The new service metadata may be stored as part of the transaction object in the datastore of the network orchestrator.

Accordingly, by applying the service metadata inside the critical section and identifying service metadata conflicts inside the critical section, the network orchestrator can utilize the guarded commands of the service metadata to (re-)calculate value(s) without rerunning the service transaction, thereby improving throughput.

In some examples, step "7" may occur while the transaction object is in the critical section. In other examples, the network orchestrator may apply the service metadata outside of the critical section.

At "8", the network orchestrator may persist and propagate (e.g., deliver) the changes to the nodes in the data network using the southbound API. In some examples, the changes are propagated while still inside the critical section. The transaction object may then leave the critical section, and release all other acquired locks. The critical section of a lock carefully controls the incoming transactions, and prevents the transactions to access the lock at the same time. The transaction object may then terminate.

Figure 2A:
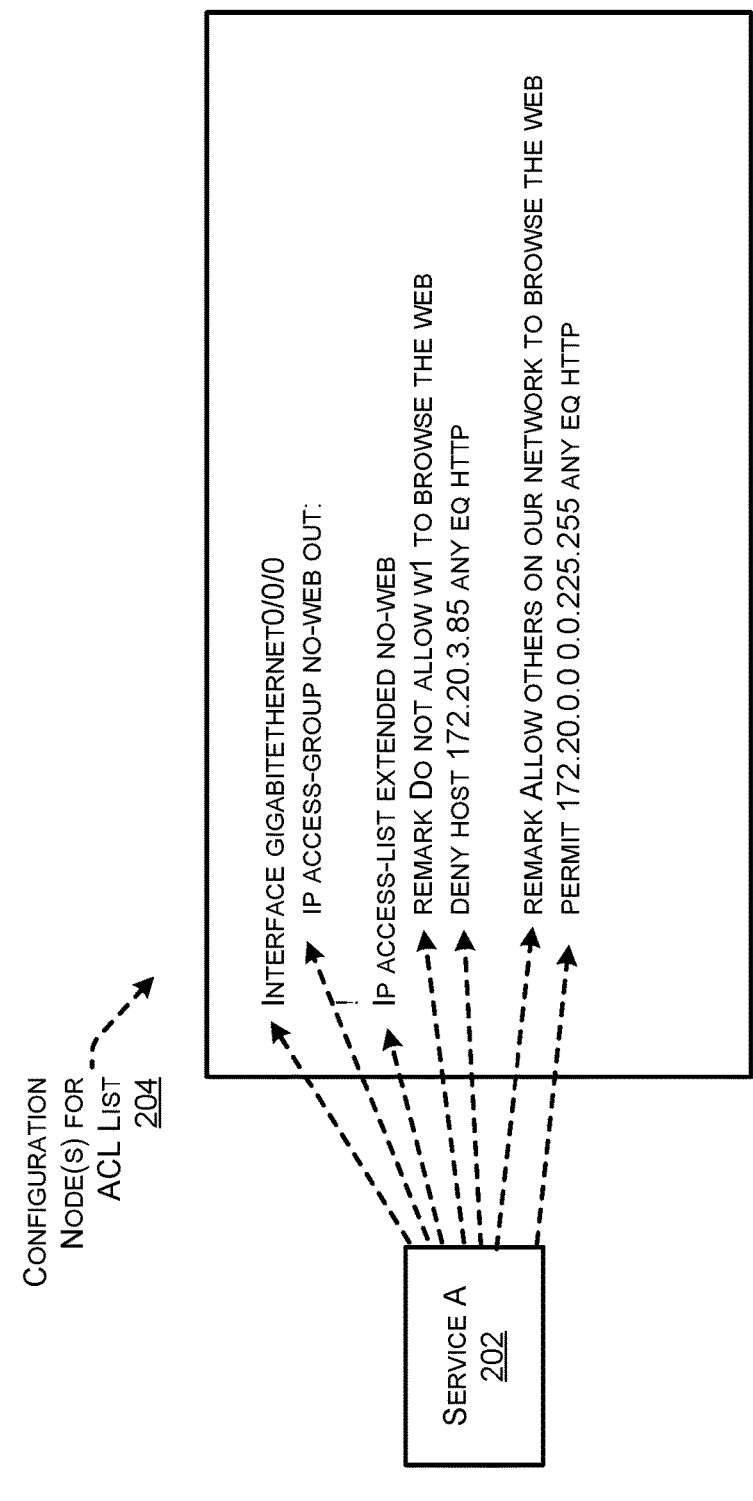
FIGS. 2A and 2B illustrate example results of service(s) executing a transaction in parallel according to the system described in FIG. 1.
Figure 2B:
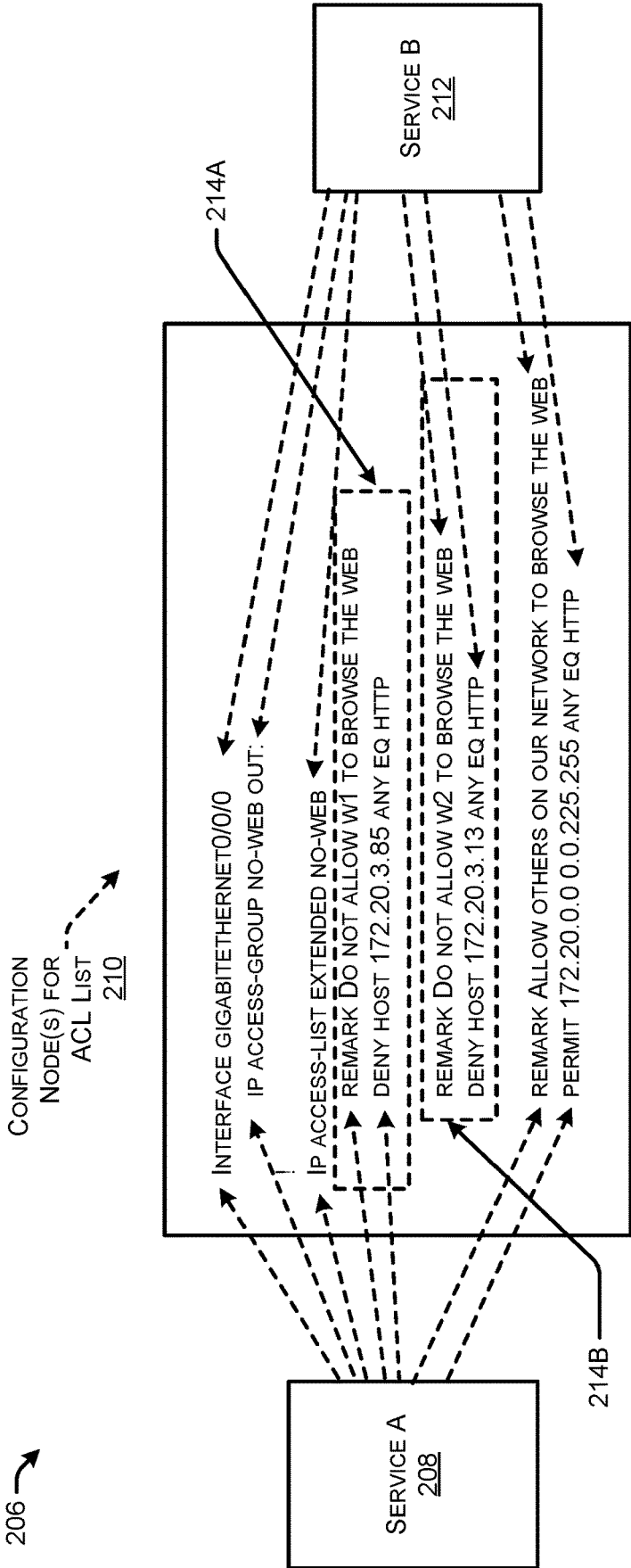

FIGS. 2A and 2B illustrate example environments of service(s) executing a transaction according to the system described in FIG. 1. FIG. 2A may correspond to an example result of a single service executing a service intent. FIG. 2B may correspond to an example result of multiple services executing service intents on the same configuration node (e.g., in parallel). As illustrated in FIG. 2A, a first service 202 (e.g., Service A 202), may execute a service intent (e.g., create the "interface gigabitethernet0/0/0" and create and assign the no-web ACL list to the interface). In this example, Service A defines what user(s) cannot access the interface and ensures that other users can access the interface. For instance, the configuration nodes for ACL list 204 corresponds the result of Service A executing the service intent. As illustrated in FIG. 2A, each line of exemplary code in the configuration node(s) for ACL list 204 may correspond to an individual node within a service network.

As illustrated in FIG. 2B, an example environment 206 may include a first service 208 (e.g., Service A 208) and a second service 212 (e.g., Service B 212) that may execute a service intent on the same configuration node(s) 210 in parallel. In some examples, Service A 208 may execute first and Service B 212 may execute second. The configuration node(s) for ACL list 210 may indicate the result of services A and B executing. In this example, Service A and Service B have shared ownership of some of the configuration node(s) 210. For instance, Service A 208 may have exclusive ownership over first configuration nodes 214A and Service B 212 may have exclusive ownership over second configuration nodes 214B. All other configuration nodes 210 illustrated in FIG. 2B may have shared ownership. Accordingly, when Service A 208 is deleted, the network orchestrator needs to only remove the first configuration nodes 214A from the ACL list and nothing else since Service B 212 is still present. In order to ensure proper handling of shared ownership information and to avoid unintentional removal of configuration nodes, the network orchestrator may record shared ownership as service metadata (e.g., original value, reference counter, and backpointers) to the service owned configuration nodes, and take the service metadata into account when transforming service intent into device configuration changes.

Moreover, in order to ensure that the network orchestrator processes concurrent requests correctly, requests must be processed as transactions. In existing systems, when multiple service instances have overlapping configuration nodes that are executed in parallel as separate transactions, they will conflict as all of them depend on and change the shared ownership information (e.g., read and write operations on the service metadata) of the shared configuration nodes. The conflict is necessary as their view of the shared ownership information is outdated. For example, in FIG. 2B, Service A 208 and Service B 212 may execute in parallel. Both services may create the ACL list and mark themselves as the sole owner of the configuration node. In this example, accepting both transactions would result in data loss: either Service A 208 or Service B 212 would not be marked as the owner of the ACL list, and may cause unintended removal of configuration nodes by the network orchestrator in the future.

As noted above, the current techniques address this problem and ensure the correct behavior of the network orchestrator by recording service metadata changes as operations in the transaction object at the service invocation phase and service metadata operations are expressed as guarded commands. In this way, conflicts may be reduced.

FIG. 3 illustrates a component diagram 300 of an example orchestrator device (e.g., user device 106, network device 114, and/or orchestrator 112) through which can manage, handle service conflicts and performs network functions according to some aspects of the present disclosure. The orchestrator device may be any type of computing device capable of receiving expressions of network functions via a network interface 304 and sending network commands to the network 110 via a suitable data communications network such as, but not limited to, a laptop or desktop computer, a tablet computing device, a server computer, a television, or a mobile telephone.

As illustrated, the orchestrator device 112 may include one or more hardware processors 302 (processors), one or more devices, configured to execute one or more stored instructions. The processor(s) 302 may comprise one or more cores. Further, the orchestrator device 112 may include one or more network interfaces 304 configured to provide communications between the orchestrator 112, and/or other systems or devices in the data network 102 and/or remote from the data network 102. The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi, and so forth.

The orchestrator device 112 can include one or more power supplies 306, such as one or more batteries, connections to mains power, etc. The orchestrator device 112 can also include one or more inputs and outputs 308 for receiving and processing input from a number of input devices, such as a keyboard, a mouse, a touchpad, a touch screen, an electronic stylus, or other type of input device. Further, the input/outputs 308 can include a display, such as a computer monitor, a flat-panel display, a digital projector, a printer, or other type of output device. It will be appreciated that the orchestrator device 112 might not include all of the components shown in FIG. 3, can include other components that are not explicitly shown in FIG. 2, or might utilize an architecture completely different than that shown in FIG. 3.

The orchestrator device 112 may also include memory 310, such as computer-readable media, that stores various executable components (e.g., software-based components, firmware-based components, etc.). The memory 310 may generally store components to implement functionality described herein. The memory 310 may store an operating system 312 utilized to control the operation of components of the orchestrator device 112. Further, the memory 310 may store a communication component 314 that comprises software (e.g., any protocol stack) to enable the orchestrator device 112 to communicate with other devices using the network interface 304.

In some instances, the memory 310 may store a working stage component 316 configured to enable orchestrator device 112 to read and/or write data (configuration data, service metadata, etc.) from/to transaction object. The working stage component 316 may comprises a human readable code or binary machine code, when executed on the processor 302, may enable the orchestrator 112 to read or write configuration data from/to a transaction object. In addition, the working stage component enable the orchestrator 112 to commit the transaction object, once the data is read/written.

In some instances, the memory 310 may store a service processing engine 318 configured to enable orchestrator device 112 to determine the minimal set of operations on the configuration node level to deliver the result of a service invocation. The service processing engine 318 may comprises a human readable code or binary machine code, when executed on the processor 302, may enable the orchestrator 112 to calculate the effects of all collected transaction objects and/or determine the minimal set of operations on the configuration node level to deliver the result of a service invocation. When a transaction object enters the service invocation phase and/or critical section, the service processing engine 318 may be invoked.

In some instances, the memory 310 may store a service application component 320 configured to enable orchestrator device 112 to perform conflict detection. The service application component 320 may comprises a human readable code or binary machine code, when executed on the processor 302, may enable the orchestrator 112 to perform an incremental conflict detection process and/or apply the service metadata.

The orchestrator 112 may further include a data store 322, which may comprise any type of computer memory including long-term memory (e.g., Read Only Memory (ROM), Random Access Memory (RAM), caches, etc.). The data store 322 may include a service tracking data component 324 that tracks all currently running network services. Further, the data store 322 may include service ownership information 326 associated with each node in the data network, which may comprise a plurality of guards and/or guarded commands associated with service metadata (e.g., one or more of reference value, backpointers, and/or original value).

FIG. 4 illustrates a flow diagram of an example method for processing transactions by a network orchestrator while in a service invocation phase. In some instances, the steps of method 400 may be performed by a device (e.g., network orchestrator 112, etc.) that includes one or more processors and one or more non-transitory computer-readable media storing computer-executable instructions that, when executed by the one or more processors, cause the one or more processors to perform operations of method 400.

At 402, the network orchestrator may receive a service invocation. In some examples, the service invocation may comprise a transaction object (e.g., such as an optimistic transaction object). In some examples, the transaction object may be associated with service metadata (e.g., service ownership information, such as reference value, backpointer, and/or original value). In some examples, a service invocation is received whenever a service intent is changed (e.g., created, modified, deleted, etc.).

At 404, the network orchestrator may determine, a number of operations to implement service invocation. For instance, as noted above, the network orchestrator may utilize a service processing engine to determine the minimal set of operations (e.g., create, modify, delete, etc.) on the configuration node level to deliver the result of the service invocation to the network. In some examples, the service processing engine makes decisions based both on the current state of the configuration node and on the shared ownership information (e.g., service metadata) assigned to the configuration node.

At 406, the network orchestrator may record one or more guards associated with the service metadata. For instance, the one or more guards may comprise guarded commands with no-op as the operation. In some examples, the guards correspond to the decisions and/or assumptions made by the network orchestrator and/or service processing engine.

In some examples, guards may be associated with one or more of a reference count (e.g., value to indicate the number of owners of a given configuration node); original value (e.g., value used to store and/or remember the original value of a leaf configuration node prior to a first service instance change); and/or backpointers (e.g., used to identify the owner(s) of a given configuration node). In some examples, such as where a leaf configuration node preexists before the service invocation phase, the network orchestrator may store the original value of the leaf node, such that when all services associated with the leaf node are deleted, the original value of the leaf node may be restored. In this way, the network orchestrator is configured to operate on data that the network orchestrator does not initially create.

Examples of guards for reference count may include one or more of

{gt, non_negative_integer( )}: the value of the reference count is greater that the given non-negative integer value.

{eq, false}: the reference count does not exist.

{neq, false}: the reference count does exist.

{neq, non_negative_integer( )}: the value of the reference count is not equal to the given non-negative integer value.

Examples of guards for original value may include one or more of

{eq, string( )}: the value of the original value equals the given value.

{eq, false}: the original value does not exist.

{neq, false}: the original value does exist.

{neq, string( )}: the value of the original value is not equal to the given value.

Examples of guards for backpointers may include one or more of:

{member, service_path( ), Boolean( )}: Does the list of backpointers contain the given service path?

{eq, false}: the backpointer list does not exist

{neq, false}: the backpointer list does exist.

{size_eq, non_negative_integer( )}: the length of the backpointer list equals to the given number.

{size_neq, non_negative_integer( )}: the length of the backpointer list is not equal to the given number.

{size_gt, non_negative_integer( )}: the length of the backpointer list is greater than the given number.

{is_empty, Boolean( )}: is the backpointer list empty?

At 408, the network orchestrator may record one or more guarded commands associated with the service metadata. For instance, based on the decisions made at 406, the network orchestrator and/or service processing engine may record service metadata changes (e.g., service ownership changes) on the configuration nodes as guarded commands.

Examples of guarded commands for reference count may include one or more of:

{{eq, false} {neq, false}, {set_rfc, [Val]}}: if and only if the reference count exists/doesn't exist, assign Val to the reference count.

{{neq, false}, {inc_rfc, [IncBy]}: if and only if the reference count exists, increment the value of the reference count by IncBy.

{{gt, DecBy}, {dec_rfc, [DecBy]}: if and only if the reference count is greater than DecBy, decrement the value of the reference count by DecBy.

{true, del_rfc}: delete the reference count.

{{eq, false} {neq, false}, get_rfc}: if and only if the reference count exists/doesn't exist, return the current value of the reference count.

Examples of guarded commands for original value may include one or more of

{eq, OldVal}, {set_ov, [NewVal]}}: if and only if the value of the original value equals to OldVal, set the value of the original value to the NewVal.

{eq, false} {neq, false}, get_ov}: if an only if the original value exists/doesn't exist, return the current value of the original value.

Examples of guarded commands for backpointers may include one or more of:

{true, {add_bp, [ServicePath]}}: add service path as an item to the backpointer list.

{{member, ServicePath, IsMember}, {del_bp, [Service-Path]}}: if and only if the service path is/is not the member of the backpointer list, remove the service path from the backpointer list.

{true, del_bps}: delete the backpointer list.

{{eq, false} {neq, false}, get_bps}: if and only if the backpointer list exists/doesn't exist, return the current value of the backpointer list.

{{eq, false} {neq, false}, bps_size}: if and only if the backpointer list exists/doesn't exist, return the current length of the backpointer list.

{{eq, false} {neq, false}, bps_is_empty}: if and only if the backpointer list exists/doesn't exist, return whether the backpointer list is empty.

At 410, the network orchestrator may store the guards and the guarded commands as part of the transaction object associated with the service invocation.

FIG. 5 illustrates a flow diagram of an example method 500 for processing multiple transactions in an orchestrator of a data network. In some instances, the steps of method 500 may be performed by a device (e.g., network orchestrator 112, etc.) that includes one or more processors and one or more non-transitory computer-readable media storing computer-executable instructions that, when executed by the one or more processors, cause the one or more processors to perform operations of method 500.

At step 502, the network orchestrator may receive a service invocation associated with a transaction object. In some examples, the service invocation may be associated with a service intent and/or include service ownership information (e.g., service metadata).

As noted above, the checkpoint is used to declare a point that the transaction is in a consistent state. At a checkpoint, the transaction information may be stored in a datastore. In some examples, the checkpoint may include the service intent and may be used by the network orchestrator to restart the service where a previous attempt at running the service has failed.

At step 504, the network orchestrator may store service metadata as part of the transaction object. For instance, as described above, the network orchestrator may store recorded guards and guarded commands as part of the transaction object at the service invocation phase. As described above, during the service invocation phase, the network orchestrator and/or service processing engine applies the service intent of the transaction object. For instance, the network orchestrator and/or service processing engine may calculate the minimal set of operations (e.g., create, modify, delete, etc.) on the configuration node level to deliver the result of the service intent to the network. When calculating the minimal set of operations, the service processing engine makes decisions based both on the current state of the node and on the shared ownership information (e.g., service metadata) assigned to the node. Each decision made by the service processing engine needs to be guarded, therefore, all assumptions the service processing engine makes are recorded as guards (e.g., guarded commands with no-op as the operation). Based on the decisions, the service processing engine may record service metadata changes (e.g., service ownership changes) on the node as guarded commands. The recorded guards and guarded commands may be stored by the transaction object. At the end of the service invocation phase, the transaction object may comprise one or more of the service intent, one or more configuration change(s) determined by the service processing engine, and/or service metadata context comprising one or more guarded commands.

At step 506, the network orchestrator may determine whether there is a service metadata conflict associated with the transaction object. For instance, as described above, the network orchestrator may determine whether there is a service metadata conflict during the critical section. Additionally, or alternatively, as described above, the network orchestrator may initially determine whether there is a read-write conflict (prior to taking the lock) and/or perform an incremental conflict detection inside its lock (e.g., while in the critical section). If a conflict is detected, the execution continues by checking if the conflict is a service metadata conflict. The network orchestrator may determine whether the conflict is a service metadata conflict by evaluating each of the recorded guarded commands for the node. If, while executing the guarded commands, one of the guarded commands fails, the conflict is determined to be a service metadata conflict and the transaction is retried. If all of the guarded commands pass, then the network orchestrator checks if the transaction can be retried or needs to be aborted. The transaction can be retried where all of the conflicts occurred during a retry scheme (e.g., during service invocation, during callbacks, and/or any other appropriate retry scheme). Since this process is considered expensive as only one transaction object can be in the critical section at a given time, reducing the amount of conflicts and/or time in the critical section may improve throughput of the network orchestrator and/or data node(s).

At step 508, the network or orchestrator may, in response to determining that there is a service metadata conflict, retry the service transaction. Alternatively, the network orchestrator may in response to determining that there is not a service metadata conflict, apply the service metadata. For instance, as described above, for each node where there is a shared ownership change and a sequence of guarded commands recorded as part of the transaction object. The network orchestrator may read the current value(s) of each guarded command from a database associated with the node and, using the current value(s), apply each guarded command in sequence. If any of the guarded commands fail, then the network orchestrator determines that an unresolvable service metadata conflict has occurred and the service transaction is retried. In some examples, the service transaction may be retried automatically by the network operator (e.g., without user and/or administrator input). If all of the guarded commands pass, then new service metadata may be calculated, where the new service metadata comprises a result of applying each guarded command (e.g., performing the guarded command only if the guard passes) in a sequence for a given node. The new service metadata may represent the updated shared ownership information. The new service metadata may be stored as part of the transaction object in the datastore of the network orchestrator.

In some examples and as described in FIG. 1 above, the network orchestrator may persist and propagate the configuration changes to the nodes of the data network.

Figure 6:
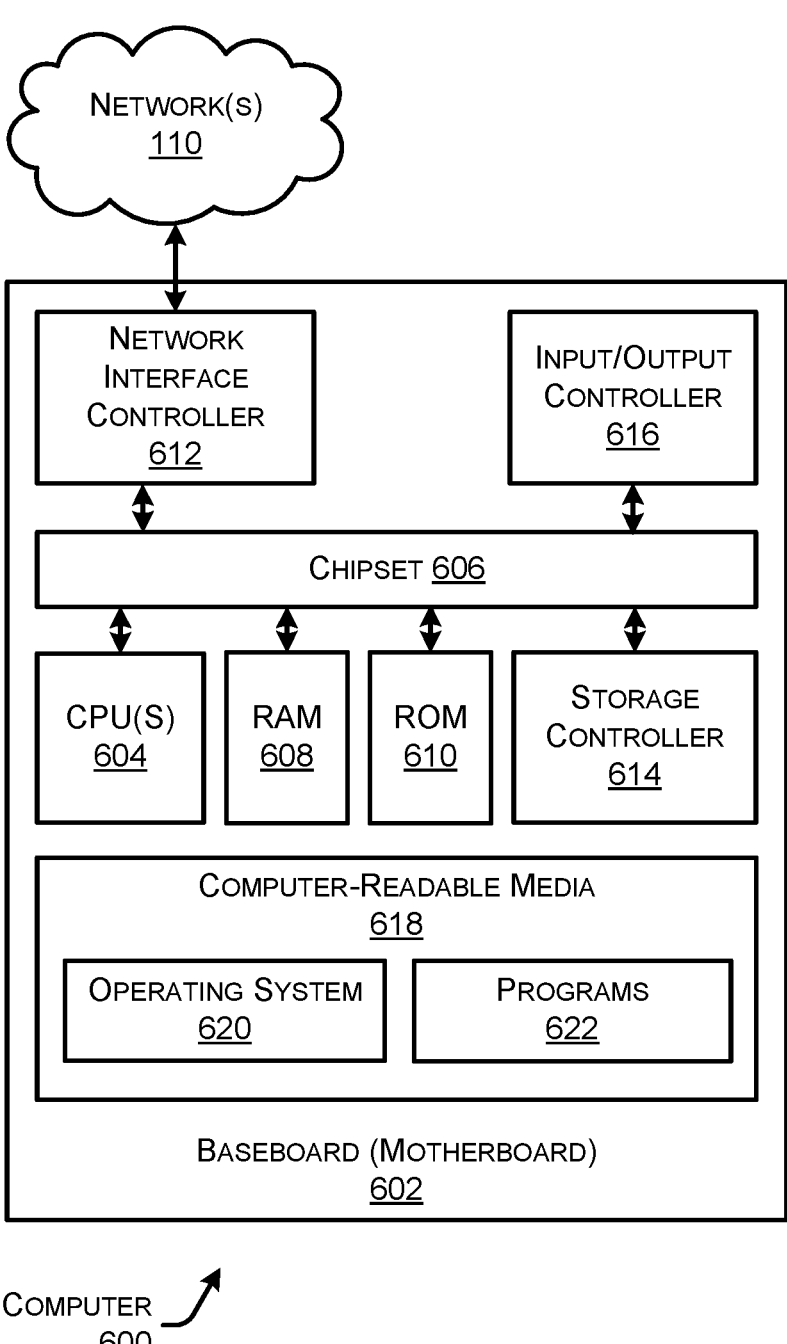
FIG. 6 is a computer architecture diagram showing an illustrative computer hardware architecture for implementing a computing device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to an orchestrator device 112, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 112. The chipset 606 can include functionality for providing network connectivity through a NIC 612, such as a gigabit Ethernet adapter. The NIC 612 is capable of connecting the computer 600 to other computing devices over the network 110. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network orchestrator 112, and or any components included therein, may be supported by one or more devices similar to computer 600. Stated otherwise, some or all of the operations performed by orchestrator device 112 and/or network controller 112, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 1300 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIGS. 1-5, can include other components that are not explicitly shown in FIG. 6, or might utilize an architecture completely different than that shown in FIG. 6.

As described herein, the computer 600 may comprise one or more of a orchestrator device 112 and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the orchestrator device 112. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for generating SNFs using a DSL and/or deploying SNFs to optimized network components.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for a network orchestrator to manage configurations of devices in a network, the method comprising:

determining, at the network orchestrator, that a first service and a second service are each allowed to make configuration changes to a device in the network, the first service and the second service each being computing systems;

storing, at the network orchestrator, shared ownership information indicating guarded commands associated with the device that are shared by the first service and the second service, wherein the first service and the second service are each configured to perform the guarded commands;

identifying, at the network orchestrator, a first service invocation requested by the first service to change current configurations of the device;

determining, at the network orchestrator, a first configuration change for the current configurations of the device in order to accomplish the first service invocation;

calculating a set of operations that are to be performed to implement the first configuration change to accomplish the first service invocation;

identifying, at the network orchestrator, a second service invocation requested by the second service to change the current configurations of the device;

determining, at the network orchestrator, a second configuration change for the current configurations of the device in order to accomplish the second service invocation;

determining that the first configuration change and the second configuration change are scheduled to be provisioned to the device at least partly in parallel;

prior to provisioning the first configuration change or the second configuration change and based at least in part on the first configuration change and the second configuration change being scheduled to be applied at least partly in parallel, evaluating the guarded commands to determine whether the set of operations conflict with the guarded commands that are performable by the first service and the second service; and in response to determining that the set of operations do not conflict with the guarded commands, provisioning the first configuration change and the second configuration change at least partly in parallel; and in response to determining that the set of operations do conflict with the guarded commands first configuration change does conflict with the second configuration change, delaying at least one of the first configuration change or the second configuration change from being provisioned.

2. The method of claim 1, further comprising:

storing first metadata in association with a first portion of the current configurations, the first metadata indicating that the first service provisioned the first portion of the current configurations;

storing second metadata in association with a second portion of the current configurations, the second metadata indicating that the second service provisioned the second portion of the current configurations;

determining that the first configuration change does not affect the second portion of the current configurations; and determining that the second configuration change does not affect the first portion of the current configurations.

3. The method of claim 1, wherein the first configuration change is received as first service intent and the second configuration change is received as second service intent, further comprising:

translating the first service intent into a first service transaction associated with a first transaction object; and translating the second service intent into a second service transaction associated with a second transaction object, wherein the determining whether the set of operations conflict with the guarded commands includes processing the first service transaction object and the second service transaction object.

4. The method of claim 1, further comprising:

storing first metadata in association with a first portion of the current configurations, the first metadata indicating that the first service provisioned the first portion of the current configurations;

identifying a minimal set of operations associated with provisioning the second configuration change; and determining that the minimal set of operations does not affect the first portion of the current configurations provisioned by the first service.

5. The method of claim 1, further comprising:

determining a minimal set of operations associated with provisioning the second configuration change, the determining the minimal set of operations including:

evaluating a first guarded command against the current configurations of the device; and evaluating a second guarded command against shared ownership information indicating services that have provisioned portions of the current configurations on the device.

6. The method of claim 1, further comprising:

determining that the first service has provisioned a first portion of the current configurations on the device;

determining that the second service has provisioned a second portion of the current configurations on the device;

determining, that the first service and the second service have shared ownership of the current configurations; and determining that the first service and the second service are permitted to make configuration changes based at least in part on the first service and the second service having shared ownership of the current configurations.

7. The method of claim 1, wherein:

determining that the first configuration change and the second configuration change are scheduled to be provisioned to the device at least partly in parallel occurs in a service invocation phase; and determining whether the first configuration change conflicts with the second configuration change occurs in a critical section phase.

8. A system that runs a network orchestrator to manage configurations of devices in a network, the system comprising:

one or more processors; and one or more non-transitory computer-readable media storing computer-executable instructions that, when executed by the one or more processors, cause the one or more processors to perform operations comprising:

determining, at the network orchestrator, that a first service and a second service are each allowed to make configuration changes to a device in the network, the first service and the second service each being computing systems;

storing, at the network orchestrator, shared ownership information indicating guarded commands associated with the device that are shared by the first service and the second service, wherein the first service and the second service are each configured to perform the guarded commands;

identifying, at the network orchestrator, a first service invocation requested by the first service to change current configurations of the device;

determining, at the network orchestrator, a first configuration change for the current configurations of the device in order to accomplish the first service invocation;

calculating a set of operations that are to be performed to implement the first configuration change to accomplish the first service invocation;

identifying, at the network orchestrator, a second service invocation requested by the second service to change the current configurations of the device;

determining, at the network orchestrator, a second configuration change for the current configurations of the device in order to accomplish the second service invocation;

determining that the first configuration change and the second configuration change are scheduled to be provisioned to the device at least partly in parallel;

prior to provisioning the first configuration change or the second configuration change and based at least in part on the first configuration change and the second configuration change being scheduled to be applied at least partly in parallel, evaluating the guarded commands to determine whether the set of operations conflict with the guarded commands that are performable by the first service and the second service; and in response to determining that the set of operations do not conflict with the guarded commands, provisioning the first configuration change and the second configuration change at least partly in parallel; and in response to determining that the set of operations do conflict with the guarded commands, delaying at least one of the first configuration change or the second configuration change from being provisioned.

9. The system of claim 8, the operations further comprising:

storing first metadata in association with a first portion of the current configurations, the first metadata indicating that the first service provisioned the first portion of the current configurations;

storing second metadata in association with a second portion of the current configurations, the second metadata indicating that the second service provisioned the second portion of the current configurations;

determining that the first configuration change does not affect the second portion of the current configurations; and determining that the second configuration change does not affect the first portion of the current configurations.

10. The system of claim 8, the operations further comprising:

storing first metadata in association with a first portion of the current configurations, the first metadata indicating that the first service provisioned the first portion of the current configurations;

identifying a minimal set of operations associated with provisioning the second configuration change; and determining that the minimal set of operations does not affect the first portion of the current configurations provisioned by the first service.

11. The system of claim 8, the operations further comprising:

determining a minimal set of operations associated with provisioning the second configuration change, the determining the minimal set of operations including:

evaluating a first guarded command against the current configurations of the device; and evaluating a second guarded command against shared ownership information indicating services that have provisioned portions of the current configurations of the device.

12. The system of claim 8, the operations further comprising:

determining that the first service has provisioned a first portion of the current configurations of the device;

determining that the second service has provisioned a second portion of the current configurations of the device;

determining, that the first service and the second service have shared ownership of the current configurations; and determining that the first service and the second service are permitted to make configuration changes based at least in part on the first service and the second service having shared ownership of the current configurations.

13. The system of claim 8, wherein:

determining that the first configuration change and the second configuration change are scheduled to be provisioned to the device at least partly in parallel occurs in a service invocation phase; and determining whether the first configuration change conflicts with the second configuration change occurs in a critical section phase.

14. The system of claim 8, wherein the first configuration change is received as first service intent and the second configuration change is received as second service intent, the operations further comprising:

translating the first service intent into a first service transaction associated with a first transaction object; and translating the second service intent into a second service transaction associated with a second transaction object, wherein the determining whether the set of operations conflict with the guarded commands includes processing the first service transaction and the second service transaction.

15. One or more non-transitory computer-readable media storing computer-executable instructions that, when executed by one or more processors, cause a network orchestrator to perform operations comprising:

determining, by the network orchestrator, that a first service and a second service are each allowed to make configuration changes to a device in a network, the first service and the second service each being computing systems;

storing, by the network orchestrator, shared ownership information indicating guarded commands associated with the device that are shared by the first service and the second service, wherein the first service and the second service are each configured to perform the guarded commands;

identifying, by the network orchestrator, a first service invocation requested by the first service to change current configurations of the device;

determining, by the network orchestrator, a first configuration change for the current configurations of the device in order to accomplish the first service invocation;

calculating a set of operations that are to be performed to implement the first configuration change to accomplish the first service invocation;

identifying, by the network orchestrator, a second service invocation requested by the second service to change the current configurations of the device;

determining, by the network orchestrator, a second configuration change for the current configurations of the device in order to accomplish the second service invocation;

determining that the first configuration change and the second configuration change are scheduled to be provisioned to the device at least partly in parallel;

prior to provisioning the first configuration change or the second configuration change and based at least in part on the first configuration change and the second configuration change being scheduled to be applied at least partly in parallel, evaluating the guarded commands to determine whether the set of operations conflict with the guarded commands that are performable by the first service and the second service; and in response to determining that the set of operations do not conflict with the guarded commands, provisioning the first configuration change and the second configuration change at least partly in parallel; and in response to determining that the set of operations do conflict with the guarded commands, delaying at least one of the first configuration change or the second configuration change from being provisioned.

16. The one or more non-transitory computer-readable media of claim 15, the operations further comprising:

storing first metadata in association with a first portion of the current configurations, the first metadata indicating that the first service provisioned the first portion of the current configurations;

storing second metadata in association with a second portion of the current configurations, the second metadata indicating that the second service provisioned the second portion of the current configurations;

determining that the first configuration change does not affect the second portion of the current configurations; and determining that the second configuration change does not affect the first portion of the current configurations.

17. The one or more non-transitory computer-readable media of claim 15, the operations further comprising:

storing first metadata in association with a first portion of the current configurations, the first metadata indicating that the first service provisioned the first portion of the current configurations;

identifying a minimal set of operations associated with provisioning the second configuration change; and determining that the minimal set of operations does not affect the first portion of the current configurations provisioned by the first service.

18. The one or more non-transitory computer-readable media of claim 15, the operations further comprising:

determining a minimal set of operations associated with provisioning the second configuration change, the determining including:

evaluating a first guarded command against the current configurations of the device; and evaluating a second guarded command against shared ownership information indicating services that have provisioned portions of the current configurations of the device.

19. The one or more non-transitory computer-readable media of claim 15, the operations further comprising:

determining that the first service has provisioned a first portion of the current configurations of on the device;

determining that the second service has provisioned a second portion of the current configurations of on the device;

determining, that the first service and the second service have shared ownership of the current configurations; and determining that the first service and the second service are permitted to make configuration data based at least in part on the first service and the second service having shared ownership of the current configurations.

20. The one or more non-transitory computer-readable media of claim 15, wherein:

determining that the first configuration change and the second configuration change are scheduled to be provisioned to the device at least partly in parallel occurs in a service invocation phase; and determining whether the first configuration change conflicts with the second configuration change occurs in a critical section phase.

\* \* \* \* \*